United States Patent [19]

Chaffee et al.

[11] Patent Number: 4,774,281

[45] Date of Patent: Sep. 27, 1988

[54] LOW COMPRESSION SET SILICONE RUBBER

[75] Inventors: Roger G. Chaffee; Carl M. Monroe, both of Midland, Mich.

[73] Assignee: Dow Corning Corporation, Midland, Mich.

[21] Appl. No.: 93,329

[22] Filed: Sep. 4, 1987

[51] Int. Cl.$^4$ .............................................. C08L 83/04
[52] U.S. Cl. .................................... 524/588; 524/861; 524/862; 525/478; 528/24; 528/31; 528/32
[58] Field of Search .......................... 528/24, 31, 32; 525/478; 524/588, 861, 862

[56] References Cited

U.S. PATENT DOCUMENTS

| | | |
|---|---|---|
| 2,803,619 | 8/1957 | Dickmann . |
| 3,183,205 | 5/1965 | Bailey et al. . |
| 3,817,910 | 6/1974 | Viksne . |
| 4,329,275 | 5/1982 | Hatanaka et al. ............. 528/24 |
| 4,451,634 | 5/1984 | Hatanaka et al. ............. 528/31 |
| 4,539,357 | 9/1985 | Bobear . |

Primary Examiner—Melvyn I. Marquis
Attorney, Agent, or Firm—Edward C. Elliott

[57] ABSTRACT

A silicone rubber stock, giving an elastomer upon cure by hot air-vulcanization which has a low compression set, is obtained when a silicon composition containing at least two ≡SiH groups is added to a silicone rubber base which contains a polydiorganosiloxane gum having at least two alkenyl groups per molecule.

6 Claims, No Drawings

LOW COMPRESSION SET SILICONE RUBBER

BACKGROUND OF THE INVENTION

1. Field of the Invention

This invention relates to high consistency silicone rubber compositions, cured by hot air vulcanization, which have improved compression set.

2. Background Information

Various methods have been discovered for producing silicone rubber which has low compression set. For example, U.S. Pat. No. 2,803,619. issued Aug. 20, 1957, teaches a mixture of non-alkenyl polysiloxane and a vinyl-containing polysiloxane with an organo peroxide vulcanizing catalyst.

U.S. Pat. No. 3,183,205, issued May 11, 1965, teaches the use of a dialkyl peroxide curing agent in conjunction with a gum containing vinyl groups.

Another method for improving compression set is taught in U.S. Pat. No. 3,817,910, issued June 18, 1974. This method incorporates alkaline earth metal silicates in curable organopolysiloxane compositions.

Australian Pat. No. 8,436,959, issued July 24, 1985, describes a heat vulcanizable organopolysiloxane composition which contains at least 3 additives selected from organohydrogen polysiloxane, organofluoropolymer, organosiloxane containing at least one (meth)acryloxyalkyl group, and a boron compound.

After the method of improving the compression set of a silicone rubber which was cured by hot air-vulcanization was discovered, it was found that similiar compositions had been disclosed that provided for high tear strength silicone rubber, such as U.S. Pat. No. 4,539,357. issued Sept. 3, 1985, which teaches a silicon composition that cures to a silicone elastomer having a tear strength of above 100 psi. The composition comprises a blend of vinyl-containing gums, a silica reinforcing filler, a hydride cross-linking agent, and a peroxide curing catalyst.

SUMMARY OF THE INVENTION

The addition of a silicon composition containirg at least $2 \equiv SiH$ groups as a crosslinker to a silicone rubber base, which is cured by hot air-vulcanizing with a hot air-vulcanizing organoperoxide catalyst, gives improved compression set.

DESCRIPTION OF THE INVENTION

This invention relates to a silicone rubber composition comprising (A) a polydiorganosiloxane having a gum viscosity and at least 2 alkenyl groups per molecule, (B) a fume silica filler, and (C) a hot air-vulcanizing organoperoxide catalyst, the improvement which comprises the addition of (D) trialkylsilyl terminated a silicon composition containing at least two $\equiv SiH$ groups, whereby a curable silicone rubber composition which has an improved compression set after curing by hot air-vulcanization is obtained.

The polydiorganosiloxane gum (A) is a well known, commercial product. The organic groups are monovalent hydrocarbon radicals such as alkyl radicals such as methyl, ethyl, isopropyl, or hexyl; alkenyl radicals such as vinyl, allyl, or hexenyl; cycloaliphatic radicals such as cyclopentyl, cyclohexyl, or cyclohexenyl; aromatic hydrocarbon radicals such as phenyl, tolyl, or xylyl; araalkyl hydrocarbon radicals such as benzyl, beta-phenylethyl, or beta-phenylpropyl; and halogenated hydrocarbon radicals such as 3,3,3-trifluoropropyl radicals. For the purposes of this invention, gum is defined a a material having a viscosity, measured as Williams Plasticity Number in accordance with ASTM D-926of greater than 100. A Williams Plasticity Number of 100 is equivalent to about $4 \times 10^6$ cps. A preferred viscosity is in the range of 125 to 200 Williams plasticity Number ($10 \times 10^6$ to $80 \times 10^6$ cps) for a combination of good physical properties and easy handling on a two roll mill. The only restriction on the gum is the requirement that it have at least two alkenyl groups per molecule. Preferred are gums having dimethylvinylsilyl endblocking.

The fume silica filler is the common reinforcing filler used in silicone rubber. It has a surface area of greater than 50 $m^2/g$ with a surface area of greater than 150 $m^2/g$ preferred. The silica can be surface treated before addition to the composition, or it can be treated in situ by the addition of a hydroxyl containing polydiorganosiloxane fluid to the composition in the well known manner of preventing "creeping" of the base by the reaction between the gum and the silica filler.

The hot air-vulcanizing organoperoxide catalyst can be any of those useful for this purpose, such as 2,4-dichlorobenzoyl peroxide, and mixtures of dicumyl peroxide or tertiary-butyl perbenzoate with 2,4-dichlorobenzoyl peroxide. Preferred is 2,4-dichlorobenzoyl peroxide.

The improvement in compression set found with the composition of this invention is due to the addition of the silicon composition (D) containing at least two $\equiv SiH$ groups. The silicon composition is preferably a trialkylsilyl endblocked polydiorganosiloxane where the polydiorganosiloxane portion is from 1 to 100 mole percent methylhydrogensiloxane units and the remainder is dimethylsiloxane units. Preferred is a fluid having a degree of polymerization of less than 50. A preferred fluid is a trimethylsilyl endblocked polydiorganosiloxane having about 5 methylhydrogensiloxane units and 3 dimethylsiloxane units per molecule. The improvement in compression set is shown by measuring the compression set after 22 hours at 177° C. in accordance with ASTM D-395. Improvements have been in the range of from about 16 to 50 percent less compression set when the composition contains ingredient (D) as compared to the same compositions without ingredient (D).

The composition of this invention is prepared by mixing the silicone composition (D) into the silicone rubber base obtained by the mixing of ingredients (A), (B), and (C). The necessary amount of (D) can be less than 1 part by weight per 100 parts by weight of the base when the silicone composition has at least 50 percent of the units as methylhydrogensiloxane units. Mixing is conveniently done on a two roll mill such as is well known for use in compounding silicone rubber.

The composition of this invention is well suited for the production of extruded parts which are cured by hot air-vulcanization, and which are subjected to compression, such as gaskets and seals. The low compression set of the elastomer obtained by curing the composition of this invention by hot air-vulcanization assures that the seal will remain tight as the space it is sealing changes in dimension.

The following examples are included for illustrative purposes only and should not be construed as limiting the invention which is properly set forth in the appended claims. Parts are parts by weight.

EXAMPLE 1

A silicone rubber base was prepared by adding 100 parts of polydiorganosiloxane gum (A) having about 0.14 mol percent vinyl radicals and the rest methyl radicals with dimethylvinylsiloxy endblockers and a Williams Plasticity Number of about 150 to a dough type mixer, 8.5 parts of hydroxyl endblocked polydimethylsiloxane fluid having a viscosity of about 0.04 Pa.s at 25° C. and about 4 weight percent silicon-bonded hydroxyl radicals, and 30 parts of fume silica having a surface area of about 250 m$^2$/g. The mixture was stirred until massed, then mixed and heated to 125° to 140° C. under vacuum for one hour, then was cooled.

A comparative silicone rubber stock was prepared by milling together 100 parts of the above base and 1.2 parts of catalyst paste of 50 percent 2,4-dichlorobenzoyl peroxide in polydiorganosiloxane fluid.

A silicone rubber stock of this invention was prepared by milling together 100 parts of the above base, 1.2 parts of the above catalyst, and 0.53 part of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent.

Samples of each stock were then pressed into sheets about 0.2 mm thick and cured for 5 minutes at 116° C., then postcured for 4 hours at 200° C. in an air circulating hot air oven. The cured sheets were cut into test samples and tested for physical properties. The durometer was determined in accordance with ASTM D-2240. Tensile Strength and Elongation in accordance with ASTM D-412, and Compression Set in accordance with ASTM D-395. The results are shown below in Table I.

TABLE I

|  | This invention | Comparative |
| --- | --- | --- |
| Durometer, Shore A | 41 | 43 |
| Tensile Strength, MPa | 4.3 | 5.6 |
| Elongation, percent | 388 | 364 |
| Compression Set, percent 22 hr/177° C. | 49 | 83 |

EXAMPLE 2

A silicone rubber base was prepared in the same manner as in Example 1, but the gum was a mixture consisting of 50 parts of the gum (A) and 50 parts of dimethylvinylsiloxy endblocked polydimethylsiloxane gum (B) having a Williams Plasticity Number of about 152.

A comparative silicone rubber stock was prepared as in Example 1, but using the above base. A silicone rubber stock of this invention was prepared as in Example 1, but using the above base and 0.68 part of the methylhydrogensiloxane containing additive of Example 1.

Each stock was molded and tested as in Example 1, with the results shown in Table II.

TABLE II

|  | This invention | Comparative |
| --- | --- | --- |
| Durometer, Shore A | 37 | 40 |
| Tensile Strength, MPa | 6.0 | 6.3 |
| Elongation, percent | 544 | 443 |
| Compression Set, percent 22 hr/177° C. | 54 | 94 |

EXAMPLE 3

A silicone rubber base was prepared in the same manner as in Example 2, but 0.4 part of hydroxyl endblocked polydiorganosiloxane having methyl and vinyl radicals and having about 10 weight percent vinyl radical and about 16 weight percent hydroxyl radical was also added to the mixture before heating.

A comparative silicone rubber stock and a silicone rubber stock of this invention were prepared from the above bases in the same manner as in Example 2, then each was tested as in Example 1, with the results shown in Table III

TABLE III

|  | This invention | Comparative |
| --- | --- | --- |
| Durometer, Shore A | 40 | 44 |
| Tensile Strength, MPa | 6.6 | 5.9 |
| Elongation, percent | 517 | 376 |
| Compression Set, percent 22 hr/177° C. | 55 | 87 |

EXAMPLE 4

A silicone rubber base was prepared by mixing 47 parts of gum (A), 47 parts of gum (B) and 6 parts of dimethylvinylsiloxy endblocked polydimethylsiloxane (C) having a viscosity of about 3 Pa.s at 25° C. 8.5 parts of the hydroxyl endblocked polydiorganosiloxane fluid of Example 1, and 0.25 part of the vinyl containing polydiorganosiloxane of Example 3. The mixture was mixed, heated, and cooled as in Example 1.

A comparative silicone rubber stock was prepared by milling together 100 parts of the above base and 1.1 parts of the catalyst of Example 1.

A silicone rubber stock of this invention was prepared by milling together 100 parts of the above base, 1.1 parts of the catalyst of Example 1, and 0.64 part of the methylhydrogensiloxane containing additive of Example 1.

Each stock was molded and tested as in Example 1, with the results shown in Table IV.

TABLE IV

|  | This invention | Comparative |
| --- | --- | --- |
| Durometer, Shore A | 34 | 38 |
| Tensile Strength, MPa | 6.8 | 6.6 |
| Elongation, percent | 643 | 520 |
| Compression Set, percent 22 hr/177° C. | 36 | 73 |

EXAMPLE 5

A silicone rubber base was prepared by adding 80 parts of gum (A), 20 parts of (C), 10 parts of the hydroxyl endblocked polydimethylsiloxane fluid of Example 1, and 35 parts of the fume silica of Example 1, following the procedure of Example 1.

A comparative silicone rubber stock was prepared by milling together 100 parts of the above base and 1.2 parts of the peroxide catalyst of Example 1.

A silicone rubber stock of this invention (X) was prepared by milling together 100 parts of the above base, 1.2 parts of the peroxide catalyst of Example 1, and 0.52 part of the methylhydrogensiloxane containing additive of Example 1.

A silicone rubber stock of this invention (Y) was prepared as in (X) above, except 0.23 part of trimethylsiloxy endblocked polymethylhydrogensiloxane having a viscosity of about 0.13 Pa.s at 25° C. and a silicon-bonded hydrogen atom content of about 1.6 percent by weight was used in place of the additive in (X).

Each stock was molded and tested as in Example 1, with the results shown in Table V.

TABLE V

|  | This invention | | |
| --- | --- | --- | --- |
|  | (X) | (Y) | Comparative |
| Durometer, Shore A | 44 | 44 | 48 |
| Tensile Strength, MPa | 6.8 | 4.5 | 6.6 |
| Elongation, percent | 499 | 357 | 404 |
| Compression Set, percent 22 hr/177° C. | 54 | 67 | 80 |

That which is claimed is:

1. In a silicone rubber composition comprising
   (A) a polydiorganosiloxane having a gum viscosity and at least 2 alkenyl groups per molecule,
   (B) a fume silica filler, and
   (C) a hot air-vulcanizing organoperoxide catalyst, the improvement which comprises the addition of
   (D) a trialkylsilyl terminated silicon composition containing at least two ≡SiH groups,
   whereby a curable silicone rubber composition which has an improved compression set after curing by hot air-vulcanization is obtained.

2. The composition of claim 1 in which the hot air-vulcanizing organoperoxide catalyst is 2,4-dichlorobenzoyl peroxide.

3. The composition of claim 2 in which the silicon composition (D) is a trialkylsilyl endblocked polydiorganosiloxane said polydiorganosiloxane portion being from 1 to 100 mole percent methylhydrogensiloxane units and the remainder being dimethylsiloxane units.

4. The composition of claim 3 in which the silicon composition is a trimethylsilyl endblocked polydiorganosiloxane said polydiorganosiloxane portion being composed of about 5 methylhydrogensiloxane units and about 3 dimethylsiloxane units per molecule.

5. The composition of claim 4 in which the amount of silicon composition is less than 1 part by weight per 100 parts by weight of the other ingredients.

6. In a silicone rubber composition consisting essentially of
   (A) a polydiorganosiloxane having a gum viscosity and at least 2 alkenyl groups per molecule,
   (B) a fume silica filler, and
   (C) a hot air-vulcanizing organoperoxide catalyst, the improvement which comprises the addition of
   (D) a trialkylsilyl terminated silicon composition containing at least two ≡SiH groups, whereby a curable silicone rubber composiiton which has an improved compression set after curing by hot air-vulcanization is obtained.

* * * * *